(12) United States Patent
Palmas et al.

(10) Patent No.: US 7,150,860 B1
(45) Date of Patent: Dec. 19, 2006

(54) PROCESS AND APPARATUS FOR QUICK FEED CONTACTING WITH IMMEDIATE VAPOR DISENGAGEMENT

(75) Inventors: Paolo Palmas, Des Plaines, IL (US); Steven Niewiedzial, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 358 days.

(21) Appl. No.: 09/837,687

(22) Filed: Apr. 18, 2001

(51) Int. Cl.
*B01J 8/18* (2006.01)
*C10G 11/00* (2006.01)
*C10G 11/18* (2006.01)

(52) U.S. Cl. .................. 422/147; 422/139; 422/144; 422/145; 422/147; 208/106; 208/113; 208/161; 95/271; 55/339

(58) Field of Classification Search ................ 422/139, 422/140, 141, 142, 143, 144, 145, 147; 208/106, 208/113, 146, 148, 161, 163; 95/271; 55/339
See application file for complete search history.

(56) References Cited

U.S. PATENT DOCUMENTS

| | | | |
|---|---|---|---|
| 2,935,466 A | 5/1960 | Schoenmakers | 208/176 |
| 4,435,272 A | 3/1984 | Bartholic et al. | 280/127 |
| 4,944,845 A | 7/1990 | Bartholic | 202/84 |
| 4,985,136 A | 1/1991 | Bartholic | 208/153 |
| 5,296,131 A | 3/1994 | Raterman | 208/113 |
| 5,376,339 A * | 12/1994 | Castagnos et al. | 422/142 |
| 5,462,652 A | 10/1995 | Wegerer | 208/167 |
| 5,565,020 A * | 10/1996 | Niewiedzial | 95/271 |
| 6,039,863 A | 3/2000 | Palmas | 208/113 |
| 6,063,263 A | 5/2000 | Palmas | 208/113 |

* cited by examiner

*Primary Examiner*—Alexa D. Neckel
(74) *Attorney, Agent, or Firm*—John G. Tolomei; James C. Paschall

(57) ABSTRACT

An apparatus and process in which a catalyst nozzle and a feed nozzle are joined together at a joint in a reactor vessel that contains a disengaging transport conduit in communication with a separator. An inlet to the transport conduit is disposed vertically higher than the joint to reduce the quantity of catalyst that enters the transport conduit with the vapor product.

19 Claims, 3 Drawing Sheets

PROCESS AND APPARATUS FOR QUICK FEED CONTACTING WITH IMMEDIATE VAPOR DISENGAGEMENT

BACKGROUND OF THE INVENTION

This invention relates generally to the contacting hydrocarbon feeds with catalyst for ultra-short time periods. More specifically, this invention relates to a method and apparatus for disengaging product hydrocarbon vapor from catalyst particles

DESCRIPTION OF THE PRIOR ART

There are a number of continuous cyclical processes employing fluidized solid techniques in which an at least partially liquid phase stream containing hydrocarbon compounds contacts fluidized solids in a contacting zone and carbonaceous or other fouling materials are deposited on the solids. The solids are conveyed during the course of the cycle to another zone where foulants are removed in a rejuvenation section or, more specifically, in most cases carbon deposits are at least partially removed by combustion in an oxygen-containing medium. The solids from the rejuvenation section are subsequently withdrawn and reintroduced in whole in part to the contacting zone. The solids may be catalytic materials or inert solids.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

The processing of increasingly heavier feeds in FCC type processes and the tendency of such feeds to elevate coke production and yield undesirable products has led to new methods of contacting feeds with catalyst. Recently, methods of contacting FCC catalyst for very short contact periods have been of particular interest. Falling-curtain type arrangements for contacting feed are known from U.S. Pat. No. 2,935,466 B1, the contents of which are hereby incorporated by reference. In U.S. Pat. No. 4,985,136 B1, an FCC feed contacts a falling-curtain of catalyst for a contact time of less than 1 second is followed by a quick separation. U.S. Pat. No. 5,296,131 B1, the contents of which are hereby incorporated by reference, discloses a similar ultra short contact time process that uses an alternate arrangement for the falling catalyst curtain. The ultra short contact time system improves selectivity to gasoline while decreasing coke and dry gas production by using high activity catalyst that contacts the feed for a relatively short period of time. U.S. Pat. No. 6,039,863 B1 discloses a short contact time process that uses an elongated combustor to regenerate the catalyst. Additional arrangements for performing such feed contacting are known from U.S. Pat. No. 4,435,272 B1, U.S. Pat. No. 4,944,845 B1 and U.S. Pat. No. 5,462,652 B1.

The type of injection desired for short contact time arrangements has received particular attention. The feed may be formed into a jet by an array of identical feed injection streams or by an extended orifice that uniformly contacts a stream of catalyst flowing in a compatible pattern. The feed injection is arranged to shoot the feed into a relatively thin band of catalyst that falls in a direction transverse or perpendicular to the flow of jets.

Aside from uniform feed and catalyst contacting, short contact time also requires good separation between the catalyst and cracked hydrocarbons. The above-described prior art typically directs the catalyst and vapor mixture into a conduit that communicates with a downstream separation device. Therefore, contact of the hydrocarbons with the catalyst will continue for a substantial period of time as it flows to the separation device and while it is in the separation device.

U.S. Pat. No. 6,063,263 B1 discloses a short contact time cracking process in which a static separation device is contained in a reactor vessel in which the contacting occurs. Prior art also includes a reactor vessel that contains a cyclone and a transport conduit with an outlet directly connected to an inlet to the cyclone. Feed and catalyst nozzles bring catalyst and feed into contact in the reactor vessel at a joint that is even with an inlet to the transport conduit. The transport conduit assures rapid transport of cracked feed and entrained catalyst to the cyclone for separation. However, we have discovered that positioning the inlet of the transport conduit even with the joint between the catalyst and feed nozzles results in the transport of relatively large quantities of catalyst to the cyclone. Hence, more of the undesirable post contacting reactions can proceed while the product vapor and entrained catalyst are transported together through the transport conduit.

Accordingly, an object of the invention is to separate more of the product vapor from the catalyst before the product vapor and entrained catalyst enter the transport conduit.

SUMMARY OF THE INVENTION

We have found by modeling that by positioning an inlet to a transport conduit above the joint between the feed nozzle and the catalyst nozzle of the reactor vessel can result in substantially less catalyst entering into the transport conduit to be separated in the cyclone. Although not wishing to be bound by a particular theory, we suspect that raising the inlet to the transport conduit upwardly with respect to the joint between the catalyst and feed nozzles removes the inlet from the natural trajectory of the catalyst, so less catalyst enters the inlet.

In one embodiment, the present invention relates to a reactor vessel comprising a catalyst nozzle for delivering catalyst to the reactor vessel and a feed nozzle for delivering feed to the reactor vessel. The feed nozzle joins the catalyst nozzle at a joint proximate to a work point at which the catalyst contacts the feed to convert the feed to yield product vapor A transport conduit has an inlet for receiving the product vapor and entrained catalyst and an outlet. The inlet is disposed vertically higher than the joint between the feed nozzle and the catalyst nozzle. A cyclone has an inlet directly communicating with the outlet of the transport conduit. The cyclone also communicates with a vapor outlet extending from the vessel A dipleg extends downwardly from the cyclone for transporting catalyst toward a base of the reactor vessel.

In another embodiment, the present invention relates to a catalytic cracking reactor vessel comprising a catalyst nozzle for delivering catalyst to the reactor vessel and a feed nozzle for delivering feed to the reactor vessel. The feed nozzle joins the catalyst nozzle at a joint proximate to a work point at which the catalyst contacts the feed to crack the feed to yield product vapor. A transport conduit has an inlet facing away from the work point for receiving the product vapor and entrained catalyst and an outlet. The inlet is disposed vertically higher than the joint between the feed nozzle and the catalyst nozzle. A separator has an inlet directly communicating with the outlet of the transport conduit. The separator communicates with a vapor outlet extending from the vessel and a conduit extending downwardly from the separator for transporting catalyst toward a base of the reactor vessel.

In a further embodiment, the present invention relates to a process for cracking a heavy hydrocarbon feed to a light hydrocarbon product. The process comprises delivering catalyst to a reactor vessel through a catalyst nozzle and delivering heavy hydrocarbon feed to the reactor vessel through a feed nozzle. The feed nozzle joins the catalyst nozzle at a joint. The catalyst and the heavy hydrocarbon feed are contacted at a work point proximate to the joint to convert the heavy hydrocarbon feed to light hydrocarbon product vapor. The product vapor and entrained catalyst are withdrawn through an inlet in a transport conduit. The inlet is disposed vertically higher than the joint between the feed nozzle and the catalyst nozzle. The light hydrocarbon product vapor is transported from the inlet through an outlet in the transport conduit directly to a cyclone. The entrained catalyst is separated from the light hydrocarbon product vapor in the cyclone.

Additional objects, embodiments and details of this invention can be obtained from the following detailed description of the invention.

DETAILED DESCRIPTION OF THE INVENTION

Figure 1:
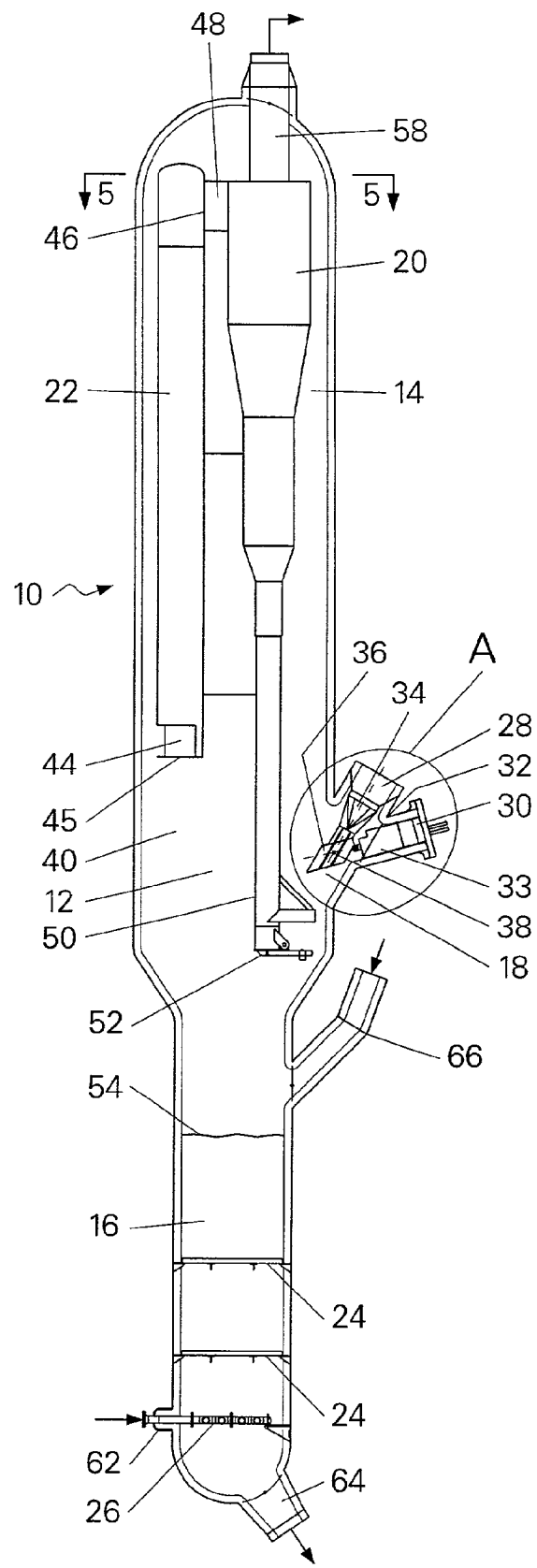
FIG. 1 is a schematic illustration of an FCC apparatus that incorporates an arrangement of this invention.

This invention can be used in combination with any type of particulate material. The material may be inert or reactive in the presence of the particular fluid material. A wide variety of inert and catalytic material is suitable for this invention. For example, in destructive distillation processes, a suitable inert material comprises an alpha alumna. FCC applications of this process can include any of the well-known catalysts that are used in the art of fluidized catalytic cracking. These compositions include amorphous-clay type catalysts which have, for the most part, been replaced by high activity, crystalline alumna silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumna silicates and are usually dispersed in a porous inorganic carrier material such as silica, alumna, or zirconium. These catalyst compositions may have a zeolite content of 30% or more. Zeolite catalysts used in the process of this invention will preferably have a zeolite content of from 25 to 80 wt-% of the catalyst. The zeolites may also be stabilized with rare earth elements and contain from 0.1 to 10 wt-% of rare earths.

Although primarily intended for use in FCC units, this invention may be useful for any process that seeks to contact hydrocarbon-containing streams with a fluidized particulate stream for short periods of time. The types of processes in which this invention may be useful include the contacting of catalyst with residual feeds and the destructive contacting of high asphaltene-containing feed with high temperature inert or catalytic particles. Suitable liquid media for this invention include any liquid stream that will enter the distributor at least partially as a liquid that is further vaporized by contact with the particulate material. Feed for destructive contacting will comprise highly refractory crudes having boiling points that extend over wide ranges and having high concentrations of metals and coke. For example one typical crude has a boiling point that ranges from 240° to 1575° F. (116° to 857° C.) with more than half of the liquid volume boiling above 1000° F. (538° C.). For the FCC process, feedstocks suitable for processing by the method of this invention include conventional FCC feeds and higher boiling or residual feeds. The most common of the conventional feeds is a vacuum gas oil which is typically a hydrocarbon material having a boiling range of from 650° to 1025° F. (343° to 552° C.) and which is prepared by vacuum fractionation of atmospheric residue. These fractions are generally low in coke precursors and the heavy metals that can deactivate the catalyst. Heavy or residual feeds, i.e., which have a boiling range above 930° F. (499° C.). and which have a high metals content, are also finding increased usage in FCC units.

This invention is more fully explained in the context of an FCC process. FIG. 1 shows an FCC arrangement that is arranged in accordance with this invention. The description of this invention in the context of the specifically disclosed process arrangement is not meant to limit it to the details disclosed therein. The FCC arrangement shown in FIG. 1 consists of a reactor 10 that includes a disengaging region 12, a separating region 14, a collection region 16 and a contacting region 18. The separating region 14 includes a separator such as a cyclone 20 and a disengagement transport conduit 22. The collection region 16 may include a series of trays 24 and a distributor 26 for the distribution of stripping media. The contacting region 18 comprises a catalyst inlet nozzle 28 and a feed nozzle 30. The arrangement circulates catalyst and contacts feed in the manner hereinafter described.

Figure 2:
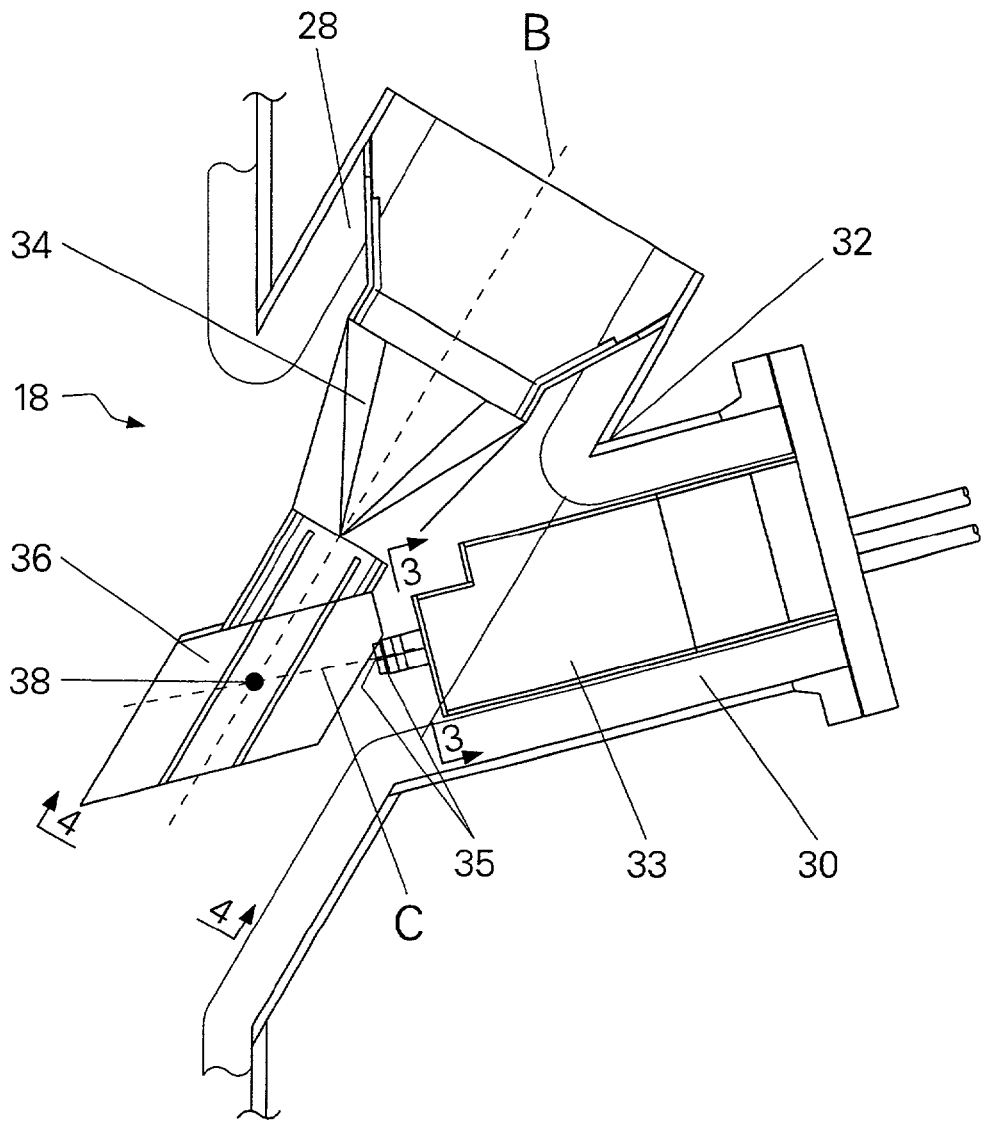
FIG. 2 is an enlarged view of section A of FIG. 1.
Figure 3:
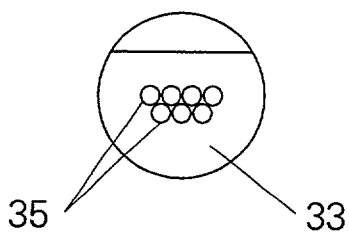
FIG. 3 is a schematic cross-section taken from segment 3—3 in FIG. 2.
Figure 4:
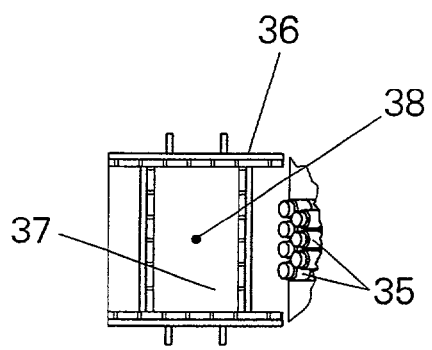
FIG. 4 is a schematic cross-section taken from segment 4—4 in FIG. 2.

FIG. 1 shows the configuration of the contacting region 18 with FIG. 2 providing an enlarged view of the contacting region 18 encircled as section "A". Fresh regenerated catalyst, spent catalyst, or a mixture thereof enters the reactor 10 generally in the direction along axis "B" through the catalyst inlet nozzle 28 which typically communicates with the end of a catalyst conduit (not shown). The feed nozzle 30 and the catalyst inlet nozzle 28 join at joint 32. Heavy hydrocarbon feed is injected into the contacting region 18 through the feed nozzle 30 generally in the direction along axis "C", preferably by a contactor 33. The contactor 33 includes an array of jets 35, shown in FIG. 3, that atomizes the feed into several streams of fine liquid droplets. The streams provide a linear array of feed that transversely contacts a curtain of catalyst falling from the catalyst inlet nozzle 28. The catalyst inlet nozzle 28 contains a funnel 34 fixed to the inside wall of the catalyst inlet nozzle 28. The funnel 34 dispenses catalyst through a rectilinear slot 37, shown in FIG. 4, to form the catalyst into a curtain that falls into a catalyst chute 36. The linear array of feed injected by the contactor 33 contacts the falling curtain of catalyst at a work point 38 in the catalyst chute 36. The work point 38 is defined by the intersection of axis B, representing the direction along which the catalyst enters, and axis C, representing the direction along which the feed enters the reactor 10. Further details for a suitable feed and catalyst nozzle configurations are provided in U.S. Pat. No. 6,063,263 B1, which is incorporated herein by reference.

Contact of the feed with the catalyst causes a rapid vaporization and a high velocity discharge of catalyst into the reactor 10. Contact between the feed and catalyst produces a vaporous hydrocarbon product while carbon is deposited or "coked" on the most active sites on the catalyst. The feed preferably contacts the curtain of falling catalyst in a transverse direction to obtain a quick contacting between the feed and the catalyst particles. For the purposes of this description the expression "transverse contacting" means the feed does not flow parallel to the direction of the falling curtain of catalyst.

Figure 5:
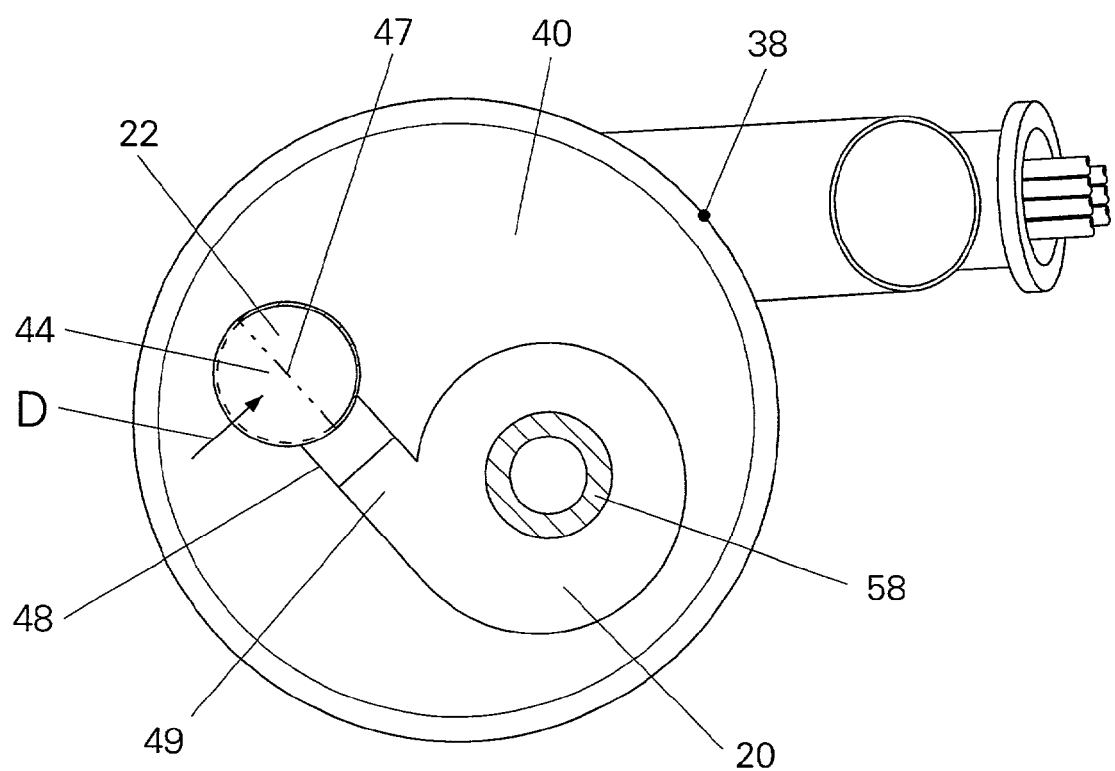
FIG. 5 is a schematic cross-section taken from segment 5—5 in FIG. 1.

The transverse contacting of the feed with the falling catalyst curtain creates a substantially horizontal trajectory of the catalyst and feed mixture into the disengaging region 12 of the reactor 10. However, because axes B and C both have a downward slope, the horizontal trajectory will have a downward component. The trajectory of the catalyst discharge from the work point 38 promotes a quick disengagement of a light vaporous hydrocarbon product stream from the relatively heavier catalyst particles. Rapid disengagement also requires a vertical space for unrestricted passage of the rising vapors upwardly through the disengaging region 12. For this purpose, the disengaging region 12 will have a substantially open volume 40 above and below the work point 38. FIG. 5 shows the open volume 40 is not obstructed by the cyclone 20 of the transport conduit 22.

Catalyst that is disengaged from the product vapor in the disengaging region 12 will fall into the dense bed of catalyst 54 in the collection region 16. The dense bed in the collection region 16 typically retains catalyst particles at a density of at least 15 lbs/ft$^3$ (240 kg/m$^3$) and, more typically, catalyst particles are retained at a density of 45 lbs/ft$^3$ (721 kg/m$^3$) or more. Dilute phase conditions existing elsewhere in the reactor 10 will have a catalyst density of less than 20 lbs/ft$^3$ (320 kg/m$^3$) and, more typically, will refer to a density of less than 10 lbs/ft$^3$ (160 kg/m$^3$). Catalyst density in the open volume 40 will vary with proximity to the work point 38, but will usually will not exceed an average of 5 lbs/ft$^3$ (80 kg/m$^3$); and typically, it will have an average catalyst density of less than 3 lb/ft$^3$ (48 kg/m$^3$).

The separating region 14 of the reactor 10 includes the cylindrically shaped, disengagement transport conduit 22 which has an inlet 44 disposed above the joint 32 between the catalyst inlet nozzle 28 and the feed nozzle 30. In an embodiment, the inlet 44 is at least 3 feet (0.9 meters) above the joint 32. Disposing the inlet 44 above the joint 32 removes the inlet from the horizontal and downward trajectory of the catalyst after being contacted with the feed from the contactor 33 and propelled into the disengaging region 12. Hence, the cyclone 20 does not have to separate as much entrained catalyst from the vapor hydrocarbon product. In another embodiment, the inlet is at least 7 feet (2.1 meters) distant from the work point 38. In an embodiment, the inlet 44 is disposed at the bottom end of the transport conduit 22. The bottom end of the transport conduit 22 constitutes an end plate 45 in an embodiment. In a further embodiment, an opening of the inlet 44 constitutes a semi-cylindrical section removed from the transport conduit 22 defining a diameter 47 (FIG. 5). In another embodiment, the opening of the inlet 44 faces generally in a direction away from the work point 38 as best shown in FIG. 5, so that vapor product travels a circulation route from the work point 38 into the inlet 44 along the direction of arrow "D".

The transport conduit 22 reduces the fluid flow area to increase the velocity of the vapor product traveling to the cyclone 20. The conditions within disengaging transport conduit 22 are often referred to as fast fluidized conditions in which the upward catalyst transfer velocity may range between 20 to 60 ft/sec (6 to 18 m/sec) with a density range of from 4 to 34 lbs/ft$^3$ (64 to 545 kg/m$^3$). The transport conduit 22 serves to rapidly transport vapor product and entrained catalyst to separation in the cyclone 20 to minimize post contacting reactions, which often degrades the quality of the vapor product.

The separator, typically comprising a cyclone 20, pulls vapor product and entrained catalyst from the inlet 44 up through an outlet 46 in the transport conduit 22 through a direct conduit 48 into an inlet 49 in the cyclone 20. In an embodiment, the diameter 47 defined by the opening of the inlet 44 is parallel to the direct conduit 48 and to the inlet 49 to the cyclone 20. The cyclone 20 further separates the entrained catalyst from the product vapor. The product vapor with trace amounts of entrained catalyst exits the cyclone 20 through outlet conduit 58 which carries the effluent stream out of the reactor 10 for further processing. The entrained catalyst falls by gravity through a dipleg 50 and out through a flap valve 52 into the dense bed of catalyst 54 in the collection region 16.

Collection region 16 may serve as a stripping zone for the recovery of entrained and adsorbed hydrocarbons from catalyst entering collection region 16. Stripping gas enters the collection region 16 through a nozzle 62 and a distributor 26. A dispersed stripping gas, such as steam, rises upwardly through the catalyst. A series of trays 24 may provide redistribution of the stripping medium and stripped hydrocarbons as they pass upwardly through the bed 54. A nozzle 64 withdraws the stripped catalyst for regeneration in a regenerator vessel (not shown) and/or recycle to catalyst inlet nozzle 28 for recontacting of catalyst with the feed. The optional addition of hot regenerated catalyst to bed 54 can facilitate stripping by raising the temperature in the collection region 16. Hot catalyst may enter the collection region 16 above the dense catalyst bed 54 through a nozzle 66. Alternatively, the dense bed of catalyst 54 may be maintained higher above the entry point of the regenerated catalyst through the nozzle 66 if sufficient open volume 40 is provided.

It is also possible, through baffling not shown, to isolate recovered stripped hydrocarbons from a lower portion of dense bed of catalyst 54. Segregation of the stripped hydrocarbons can provide different product streams for downstream separation and recovery. The longer contact time of the hydrocarbons that enter the collection can substantially alter the properties of the cracked hydrocarbons recovered from the collection region 16. Separate recovery of a stream from the collection region 16 may facilitate independent recovery of an isolated product stream from an upper portion of the disengaging region 12.

The stripping medium as well as the stripped vapor hydrocarbon product will ordinarily rise through the disengaging region 12 and combine with the disengaged vapor hydrocarbon product that enters with the catalyst stream from catalyst inlet nozzle 28. The vapor product and entrained catalyst that rise through disengaging region 12 are eventually drawn into inlet 44 of the transport conduit 22 to eventually be separated in the cyclone 20.

Hydrocarbon vapors from outlet conduit 58 will, in most cases, undergo further separation for the recovery of the trace amounts of catalyst particles. Additional cyclone separators will normally provide the secondary recovery of the residual catalyst particles. After any additional catalyst recovery, products are typically transferred to a separation zone for the removal of light gases and heavy hydrocarbons from the products. For this purpose, product vapors may enter a main column (not shown) that contains a series of trays for separating heavy components such as slurry oil and heavy cycle oil from the product vapor stream. Lower molecular weight hydrocarbons are recovered from upper zones of the main column and transferred to additional separation facilities or gas concentration facilities.

The process and apparatus of this invention may initially contact the feed with regenerated catalyst, carbonized catalyst, or a mixture of the two. The process can use any type of regeneration for the removal of coke. Coke removal from the regenerated catalyst which ordinarily operates to completely remove coke from catalyst is generally referred to as "complete regeneration". Complete regeneration removes coke from the catalyst to a level of less than 0.2 wt-%, or preferably to less than 0.1 wt-%, and or more preferably, to less than 0.05 wt-% coke.

Regenerated catalyst will have a substantially higher temperature than carbonized catalyst. Regenerated catalyst that usually enters the catalyst inlet nozzle 28 will have a temperature in a range from 1100° to 1400° F. (593° to 760° C.) and, more typically, the temperature will be in a range of from 12000 to 1400° F. (649° to 760° C.). Once the catalyst mixture contacts the feed, the catalyst accumulates coke on the catalyst particles and has a lower temperature. The temperature of the carbonized catalyst will usually be in a range of from 900° to 1150° F. (482° to 621° C.), but its temperature will vary depending on its source.

EXAMPLE

A two-dimensional computational flow dynamic model was set up to study the impact of the elevation of the inlet to the disengaging transport conduit on the vapor product-catalyst separation efficiency. Three cases were studied. In case 1, the inlet for the disengaging transport conduit was set at the same elevation as the feed nozzle. In case 2, the inlet was moved up to an elevation of 0.564 meters above the feed nozzle. In case 3, the inlet was moved down to an elevation of 0.564 meters below the feed nozzle. In all cases, the inlet was set at 3.35 meters from the work point where the feed and the catalyst meet. The joint between the feed nozzle and the catalyst nozzle is at the topmost portion of the feed nozzle. For each height, the model indicated the amount of catalyst moving into the inlet of the disengaging transport conduit as a percentage of the total catalyst being injected into the reactor. The results are shown in the following Table. The results indicate that moving the inlet up above the joint decreased the amount of catalyst entering the inlet of the disengaging transport conduit by 43%.

TABLE

| Case | Height of Inlet with Respect to Feed Nozzle (m) | Catalyst Entering Inlet (%) |
|---|---|---|
| 1 | 0 | 28 |
| 2 | 0.564 | 16 |
| 3 | −0.564 | ~100 |

What is claimed is:

1. A reactor vessel comprising:
    a catalyst nozzle for delivering catalyst to said reactor vessel;
    a feed nozzle for delivering feed to said reactor vessel, said feed nozzle joining said catalyst nozzle at a joint proximate to a work point at which said catalyst contacts said feed to convert said feed to yield product vapor;
    a transport conduit having an inlet for receiving said product vapor and entrained catalyst and an outlet, said inlet being disposed vertically higher than said join between said feed nozzle and said catalyst nozzle; and
    a cyclone having an inlet directly communicating with said outlet of said transport conduit, said cyclone communicating with a vapor outlet extending from said vessel and a dipleg extending downwardly from said cyclone for transporting catalyst toward a base of said reactor vessel.

2. The reactor vessel of claim 1 further comprising a stripping section at the base of reactor vessel for stripping product vapors from said catalyst.

3. The reactor vessel of claim 2 wherein said stripping section includes a series of trays and stripping medium is injected into said stripping section.

4. The reactor vessel of claim 1 wherein said catalyst nozzle includes a slot for generating a curtain of catalyst.

5. The reactor vessel of claim 4 wherein said feed nozzle includes a feed contactor for injecting feed into said curtain of catalyst.

6. The reactor vessel of claim 4 wherein said catalyst nozzle includes a funnel section that dispenses through said slot.

7. The reactor vessel of claim 1 wherein said inlet faces away from said work point.

8. A catalytic cracking reactor vessel comprising:
    a catalyst nozzle for delivering catalyst to said reactor vessel;
    a feed nozzle for delivering feed to said reactor vessel, said feed nozzle joining said catalyst nozzle at a joint proximate to a work point at which said catalyst contacts said feed to crack said feed to yield product vapor;
    a transport conduit having an inlet facing away from the work point, said inlet for receiving said product vapor and entrained catalyst and an outlet, said inlet being disposed vertically higher than said joint between said feed nozzle and said catalyst nozzle; and
    a cyclone in said reactor vessel, said cyclone having an inlet directly communicating with said outlet of said transport conduit, said cyclone communicating with a vapor outlet extending from said vessel and a dipleg extending downwardly from said cyclone for transporting catalyst toward a base of said reactor vessel.

9. The reactor vessel of claim 8 further comprising a stripping section at the base of reactor vessel for stripping product vapors from said catalyst.

10. The reactor vessel of claim 9 wherein said stripping section includes a series of trays and stripping medium is injected into said stripping section.

11. The reactor vessel of claim 8 wherein said catalyst nozzle includes a slot for generating a curtain of catalyst.

12. The reactor vessel of claim 11 wherein said feed nozzle includes a feed contactor for injecting feed into said curtain of catalyst.

13. The reactor vessel of claim 11 wherein said catalyst nozzle further includes a funnel section that dispenses through said slot.

14. The reactor vessel of claim 8 including a heat nozzle for delivering catalyst to said stripping section.

15. A process for cracking a heavy hydrocarbon feed to a light hydrocarbon product comprising:
   delivering catalyst to a reactor vessel through a catalyst nozzle;
   delivering heavy hydrocarbon feed to said reactor vessel through a feed nozzle, sa id feed nozzle joining said catalyst nozzle at a joint;
   contacting said catalyst and said heavy hydrocarbon feed at a work point proximate to said joint to convert said heavy hydrocarbon feed to light hydrocarbon product vapor;
   withdrawing said product vapor and entrained catalyst through an inlet in a transport conduit, said inlet being disposed vertically higher than said joint between said feed nozzle and said catalyst nozzle;
   transporting said light hydrocarbon product vapor from said inlet through an outlet in said transport conduit directly to a cyclone; and
   separating said entrained catalyst from said light hydrocarbon product vapor in said cyclone.

16. The process of claim 15 further comprising expelling said catalyst from a dipleg of said cyclone.

17. The process of claim 16 further comprising stripping said catalyst expelled from said dipleg of entrained hydrocarbons.

18. The process of claim 15 further comprising expelling said lighter hydrocarbon product vapor from an outlet of said cyclone.

19. The process of claim 15 further comprising generating a curtain of catalyst before said catalyst is contacted with said heavy hydrocarbon feed.

* * * * *

UNITED STATES PATENT AND TRADEMARK OFFICE
CERTIFICATE OF CORRECTION

PATENT NO.         : 7,150,860 B1
APPLICATION NO. : 09/837687
DATED                : December 19, 2006
INVENTOR(S)       : Paolo Palmas et al.

It is certified that error appears in the above-identified patent and that said Letters Patent is hereby corrected as shown below:

In Claim 1:

Column 8, line 5, after "vapor;" insert the phrase --a disengaging region above and below said work point;--

Column 8, line 8, after "inlet being disposed" insert --in said disengaging region--

Column 8, line 8, "join" should be corrected to --joint--

In Claim 8:

Column 8, line 39, after "vapor," insert the phrase --a disengaging region above and below said work point;--

Column 8, line 43, after "said inlet being disposed" insert the phrase --in said disengaging region--

In Claim 15:

Column 9, line 11, after "vapor;" insert the phrase --discharging said catalyst and hydrocarbon product vapor horizontally into a disengaging region;--

UNITED STATES PATENT AND TRADEMARK OFFICE
CERTIFICATE OF CORRECTION

PATENT NO.       : 7,150,860 B1
APPLICATION NO.  : 09/837687
DATED            : December 19, 2006
INVENTOR(S)      : Paolo Palmas et al.

It is certified that error appears in the above-identified patent and that said Letters Patent is hereby corrected as shown below:

In Claim 15 (cont'd):

Column 9, line 14, after "disposed" insert the phrase --in said disengaging region--

Signed and Sealed this

Seventh Day of August, 2007

JON W. DUDAS
*Director of the United States Patent and Trademark Office*